United States Patent [19]

Spindler et al.

[11] 4,391,987

[45] Jul. 5, 1983

[54] PROCESS FOR THE PRODUCTION OF AQUEOUS SODIUM METHIONINATE SOLUTIONS

[75] Inventors: Manfred Spindler; Herbert Tanner, both of Hanau; Friedhelm Geiger, Erlensee; Friedrich Bittner, Bad Soden; Jurgen Martens, Alzenau, all of Fed. Rep. of Germany

[73] Assignee: Degussa Aktiengesellschaft, Frankfurt am Main, Fed. Rep. of Germany

[21] Appl. No.: 347,473

[22] Filed: Feb. 10, 1982

[30] Foreign Application Priority Data

Feb. 12, 1981 [DE] Fed. Rep. of Germany ....... 3105007

[51] Int. Cl.$^3$ .......................................... C07C 149/247
[52] U.S. Cl. .................................... 562/559; 562/554
[58] Field of Search ........................ 562/554, 575, 559

[56] References Cited

U.S. PATENT DOCUMENTS 2,557,920 6/1951 White .................................. 562/559
2,642,459 6/1953 White .................................. 562/559
3,636,098 1/1972 Shima .................................. 562/559

FOREIGN PATENT DOCUMENTS 49-1515 1/1974 Japan .................................. 562/554

OTHER PUBLICATIONS

Hill, Biochem. J., 28, pp. 1008–1013 (1934).
Haugen, "Chemical Process Principles," 2nd Ed., Part 1, pp. 146–159 (1954) TP 155 H65.
"CRC Handbook of Chemistry and Physics," 46th Ed., p. B-222 (1966).

Primary Examiner—Michael L. Shippen
Attorney, Agent, or Firm—Cushman, Darby & Cushman

[57] ABSTRACT

Aqueous sodium methioninate solutions having a low content of sodium carbonate can be recovered from the crude hydrolysis mixture resulting from the saponification of 5-($\beta$-methylmercaptoethyl)hydantoin with 1.1 to 6 equivalents of sodium hydroxide and/or sodium carbonate by cooling the crude hydrolysis mixture to a temperature below 10° C., separating off the precipitated sodium carbonate and concentrating the sodium methioninate solution remaining to 40 to 65 weight percent.

10 Claims, No Drawings

PROCESS FOR THE PRODUCTION OF AQUEOUS SODIUM METHIONINATE SOLUTIONS

BACKGROUND OF THE INVENTION

The invention is directed to a process for the production of aqueous sodium methioninate solutions having a low content of sodium carbonate from the crude hydrolysis mixtures resulting from the saponification of 5-(β-methylmercaptoethyl)-hydantoin with 1.1 to 6 equivalents of sodium hydroxide and/or sodium carbonate.

The essential aminoacid methionine for a long time, to a considerable extent has been produced synthetically and used as a feed additive, especially in industrially produced mixed feeds for birds, swine, and other agriculturally useful animals. However, problems occur in storing and processing the methionine. From the very beginning methionine present in crystalline form is not pourable and can cake during storage if this is not avoided through suitable expensive crystallization conditions. If the methionine is present in powder form, in a given case with an addition of an additive preserving pourability, then there exists the problems of dust formation occurring in the handling of all powdery materials.

A further point is the exact dosaging and homogeneous distribution of solid methionine in mixed feed. In the supplementation of mixed feeds with methionine there are used low concentrations of the order of magnitude of about 0.01 to 1.0 weight percent. In order to guarantee a homogeneous distribution, there is unavoidable the production of a special premixture containing methionine in correspondingly higher concentration.

In place of solid methionine in more advantageous manner there can be employed a liquid formulation. Liquids can be dosed exactly and homogeneously mixed with other components of the mixture present in the desired concentrations by spraying.

Since free methionine is only slightly soluble in water, there are better suited for the requirements of practice salts having good water solubility, especially sodium methioninate. Now there are indeed necessarily formed aqueous solutions of sodium methioninate of necessity if there is saponified an aqueous solution of 5-(β-methylmercaptoethyl)hydantoin with 1.1 to 6 equivalents of sodium hydroxide and/or sodium carbonate in a known and frequently used process for the production of DL-methionine. This crude hydrolysis mixture, however, likewise necessarily contains also a more or less large amount of sodium carbonate, in general at least one half to one mole per mole of sodium methioninate. This sodium carbonate is undesired as a foreign salt in the production of mixed feed.

Furthermore, moreover, it is inclined to partially crystallize out in long storage so that the crude hydrolysis mixtures are not storage stable. It would naturally be possible without further to isolate the methionine from the crude hydrolysis mixtures in known manner and to then subsequently dissolve the methionine in aqueous sodium hydroxide to a sodium methioninate solution. However, it would be simpler and above all, more favorable cost wise if there could be separated from the crude hydrolysis mixture at least the greatest part of the sodium carbonate contained therein. Previously, however, there was not known a process for the separation of sodium methioninate and sodium carbonate.

BRIEF DESCRIPTION OF THE INVENTION

The process of the invention is characterized by cooling the crude hydrolysis mixture to a temperature below 10° C., separating off the crystallized sodium carbonate and concentrating the sodium methioninate solution remaining to 40 to 65 weight percent.

Surprisingly the thus recovered sodium methioninate solutions of relatively high concentration contain only small residual amounts of sodium carbonate, in the normal case, less than 2 weight percent. They also are storage stable at low temperatures over a long time and do not deposit any solids.

A still further separation of the sodium carbonate can be attained by cooling the crude hydrolysis mixture before the separation of the sodium carbonate to a temperature between $-10$ and $+5°$ C. In this case the residual content of sodium carbonate generally falls below 1 weight percent.

The separation of the crystallized sodium carbonate can be carried out in all the customary apparatus for the separation of solids from liquids, such as filters or centrifuges.

The separated sodium carbonate can be recycled and employed again for the hydrolysis of fresh 5-(β-methylmercaptoethyl)-hydantoin.

The concentration of the sodium methioninate solution remaining after the separation of the sodium carbonate can be carried out in all of the apparatuses customarily used for the concentration of aqueous solutions, in the simplest case, in a stirred vessel having a condensate condenser placed thereon.

The content of sodium methioninate in the hydrolysis mixture in each case during the concentration can be determined in a simple manner by titration with bromide/bromate, the residual content of sodium carbonate after its separation by volumetric gas $CO_2$-determination.

Suitably in the process of the invention there are employed crude hydrolysis mixtures which are obtained in the saponification of 10 to 45 weight percent aqueous solutions of 5-(β-methylmercaptoethyl)-hydantoin.

The aqueous solutions of sodium methioninate produced according to the process of the invention in their use as feed additive have the same methioninate effectiveness as solid methionine, insofar as they are employed in equimolar amounts.

As liquid formulations in the supplementation of mixed feeds with methionine they do not require the production of special premixtures containing methionine in correspondingly higher concentration. Rather they can be homogeneously mixed directly in the concentrations provided for through spraying into a mixing chamber with the remaining components of the mixed feed already present in the desired concentration.

The process of the invention is explained in more detail in the following examples. All percentages give are percent by weight.

The process can comprise, consist essentially of, or consist of the stated steps with the recited materials.

EXAMPLE 1

There were employed 1000 ml of a crude hydrolysis mixture which was produced by saponification of a 35% aqueous solution of 5-(β-methylmercaptoethyl)-hydantoin with 2 equivalents of sodium hydroxide (as a 50% solution) at 170° C. with removal of carbon dioxide and ammonia from the reaction mixture and contained 302.9 grams (1.77 moles) of sodium methioninate and 93.8 grams (0.885 mole) of sodium carbonate and had a density of 1.19 g/cm$^3$.

This crude hydrolysis mixture was cooled to 0° C. while stirring, whereby sodium carbonate crystallized out. The precipitate formed was separated. The filtrate contained 273.7 grams of sodium methioninate and only 6.8 grams of sodium carbonate. By concentration there was obtained a clear, stable solution which contained 54.6% of sodium methioninate.

The filter cake contained in addition to 87.0 grams of sodium carbonate 29.2 grams of sodium methioninate. It was suspended with 152 grams of 50% aqueous sodium hydroxide (1.9 moles) and used to again saponify 1.77 moles of 5-($\beta$-methylmercaptoethyl)-hydantoin in the manner described above.

EXAMPLE 2

There were employed 1000 ml of a crude hydrolysis mixture which was produced by saponification of a 35% aqueous mixture solution of 5-($\beta$-methylmercaptoethyl)-hydantoin with 2 equivalents of sodium hydroxide (as a 50% solution) at 170° C. with removal of carbon dioxide and ammonia from the reaction mixture and contained 302.9 grams (1.77 moles) of sodium methioninate and 93.8 grams (0.885 mole) of sodium carbonate and had a density of 1.19 g/cm$^3$.

This crude hydrolysis mixture was cooled to +5° C. while stirring, whereby sodium carbonate crystallized out. The filtrate contained 278.2 grams of sodium methioninate and 9.2 grams of sodium carbonate.

The filter cake contained 84.6 grams of sodium carbonate and 24.7 grams of sodium methioninate After supplying sodium hydroxide liquor and/or sodium carbonate the filter cake can be used again for the saponification of 5-($\beta$-methylmercaptoethyl)-hydantoin.

EXAMPLE 3

There were employed 1000 ml of a crude hydrolysis mixture which was produced by saponification of a 35% aqueous solution of 5-($\beta$-methylmercaptoethyl)-hydantoin with 2 equivalents of sodium hydroxide (as a 50% solution) at 170° C. with removal of carbon dioxide and ammonia from the reaction mixture and contained 302.9 grams (1.77 moles) of sodium methioninate and 93.8 grams (0.885 mole) of sodium carbonate and had a density of 1.19 g/cm$^3$.

This crude hydrolysis mixture was cooled to −10° C. while stirring, whereby sodium carbonate crystallized out. The filtrate contained 267.1 grams of sodium methioninate and only 3.3 grams of sodium carbonate.

The filter cake contained 90.5 grams of sodium carbonate and 35.8 grams of sodium methioninate. After supplying sodium hydroxide liquor and/orسodium carbonate the filter cake can be used again for the saponification of 5-($\beta$-methylmercaptoethyl)-hydantoin.

What is claimed is:

1. A process for the production of an aqueous sodium methioninate solution having a low content of sodium carbonate comprising forming a crude aqueous hydrolysis mixture by the saponification of 5-($\beta$-methylmercaptoethyl)-hydantoin with 1.1 to 6 equivalents of sodium hydroxide, sodium carbonate or a mixture of sodium hydroxide and sodium carbonate, cooling the crude hydrolysis mixture to a temperature below 10° C., separating off the precipitated sodium carbonate and concentrating the sodium methioninate solution remaining to 40 to 65 weight percent.

2. A process according to claim 1 wherein the step of cooling the crude hydrolysis mixture prior to the separation of sodium carbonate is to a temperature between −10° and +5° C.

3. A process according to claim 2 wherein the saponification is carried out with sodium hydroxide.

4. A process according to claim 1 wherein the saponification is carried out with sodium hydroxide.

5. A process according to claim 1 wherein the sodium carbonate separated off contains a minor amount of sodium methioninate as impurity and this impure sodium carbonate is treated with sodium hydroxide and/or sodium carbonate in an amount sufficient to provide 1.1 to 6 equivalents of sodium carbonate or a mixture of sodium carbonate and sodium hydroxide per equivalent of 5-($\beta$-methylmercaptoethyl)-hydantoin and the thus treated sodium carbonate is recycled to saponify more 5-($\beta$-methylmercaptoethyl)-hydantoin.

6. A process according to claim 5 wherein the step of cooling the crude hydrolysis mixture before the separation of sodium carbonate is to a temperature between −10° and +5° C.

7. A process according to claim 1 consisting of the recited steps employing the recited materials.

8. A process according to claim 2 consisting of the recited steps employing the recited materials.

9. A process according to claim 5 consisting of the recited steps employing the recited materials.

10. A process according to claim 6 consisting of the recited steps employing the recited materials.

* * * * *